SCANNING CIRCUIT

Filed June 20, 1966

WITNESSES

Theodore F. Wrobel

James F. Young

INVENTOR

Charles B. Heffron

BY [signature]

ATTORNEY

United States Patent Office 3,437,877
Patented Apr. 8, 1969

3,437,877

SCANNING CIRCUIT

Charles B. Heffron, Metuchen, N.J., assignor to Westinghouse Electric Corporation, Pittsburgh, Pa., a corporation of Pennsylvania Filed June 20, 1966, Ser. No. 558,847
Int. Cl. H01j *29/70*
U.S. Cl. 315—27 6 Claims

ABSTRACT OF THE DISCLOSURE

A horizontal scanning circuit for use in a television receiver is disclosed utilizing a semiconductor switching device, such as a transistor, which is protected from damage due to high voltage arcing by employing a capacitor to couple the switching device to the high voltage transformer. The capacitor is selected to provide a relatively low impedance at the retrace frequency but a relatively high impedance at the trace frequency when arcing is most likely to occur.

The present invention relates to scanning circuits and, more particularly, to scanning circuits utilizing a semiconductor device wherein means are provided for protecting the device from damage due to malfunctions in the circuitry.

The use of transistors and other semiconductor devices in television receiver circuitry gives a number of advantages including long life, dependability, low weight and lower power consumption. A disadvantage of utilizing such devices is that they have limited current, voltage and power ratings which may cause device failure should a malfunction occur in the television circuitry. This problem is especially severe if a transistor or other semiconductor switching device is to be used in the horizontal scanning circuitry to act as a switching device to generate a high voltage through the high voltage transformer of a television receiver. Arcing is likely to occur due to the presence of high voltages which may be of the order of 20,000 volts. This voltage is necessary for application to the anode of the cathode ray tube of the television receiver. A high voltage rectifier tube is connected in the secondary of the high voltage transformer to supply the unidirectional output voltage to the anode of the cathode ray tube. At sometime during the operation of the television receiver, high voltage arcing is likely to occur between the anode of the cathode ray tube and ground or across the high voltage rectifier tube itself. If a transistor is used as a switching element in the horizontal scanning circuitry when arcing occurs, an excessive amount of power will be drawn from the horizontal scanning circuit and high voltage transformer which will cause an excessive current to pass through the collector-emitter circuit of the transistor. Under such conditions the transistor will be unable to remain in saturation and will be placed in a high peak power dissipation state. With this excess amount of energy supplied to the transistor, it is probable that the transistor will be destroyed. Since high voltage arcing is a common occurrence in television receivers, it becomes necessary that some means be provided to protect the transistor or other type of semiconductor switching device of the horizontal scanning circuit from destruction under such arcing conditions.

It is therefore an object of the present invention to provide a new and improved scanning circuit utilizing a semiconductor switching device which is protected against damage due to malfunctions.

It is a further object of the present invention to provide a new and improved scanning circuit for use in a television receiver wherein a transistor device is utilized and protected from damage due to high voltage arcing.

It is a further object to provide a new and improved horizontal scanning circuit for use in a television receiver wherein a transistor is utilized which is protected from the effects of high voltage arcing by isolating the transistor from the reflected loading of the high voltage transformer of the television receiver during the arcing period.

Generally, the present invention provides a scanning circuit operative with a high voltage transformer and includes a semiconductor switching device which is utilized as the switching element of the scanning circuit. A coupling is provided between the semiconductor switching device and the high voltage transformer to protect the semiconductor device from damage should a malfunction occur in the television circuitry such as high voltage arcing.

These and other objects of the present invention will become apparent when considered in view of the following specification and drawing, in which:

FIG. 2 is a series of waveform diagrams used in explaining the operation of the circuitry of FIG. 1, and wherein:

Curve A is a waveform showing the horizontal drive voltage,

Curve B is a waveform diagram of the collector current,

Curve C is a waveform diagram of the damper diode current,

Curve D is a waveform diagram of the deflection yoke current, and

Curve E is a waveform diagram of the collector voltage.

Figure 1:
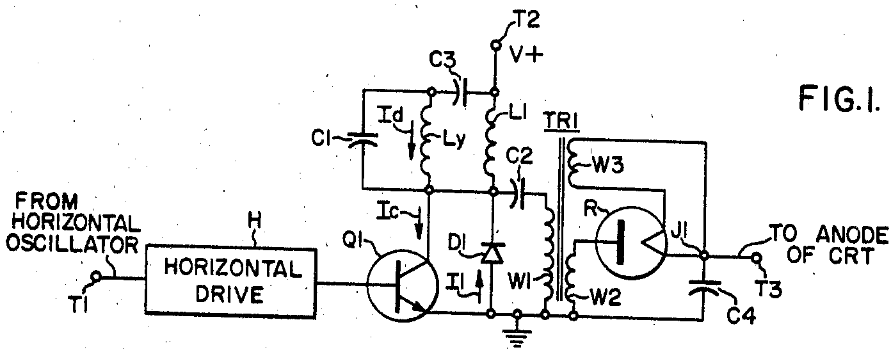
FIGURE 1 is a schematic diagram of the circuitry of the present invention.

Referring now to FIG. 1, circuitry is shown which could be utilized for the horizontal scanning and high voltage output stages of a television receiver. A transistor Q1 is used as the semiconductor switching device as shown in FIG. 1. However, it should be understood that other semiconductor switching devices operable in a switching mode, such as gate controlled switches, could also be utilized. A damper diode D1 is connected between the collector-emitter electrodes of the transistor Q1 with the anode of the damper diode D1 being connected to the emitter electrode of the transistor Q1 and the cathode of the damper diode D1 being connected to the collector of the transistor Q1. Thus, the current conductive direction of the transistor, from collector to emitter, and the conductive direction of the damper diode D1, from anode to cathode, are in reverse directions, that is, oppositely poled. A deflection coil $Ly$, which would be the horizontal deflection yoke in the present example, is connected to the collector electrode of the transistor Q1 with a resonating capacitor C1 being connected directly across the deflection yoke $Ly$. The emitter electrode of the transistor Q1 and the anode electrode of the diode D1 are connected to ground. To the base electrode of the transistor Q1 is applied the output of a horizontal drive circuit H. The input to the horizontal drive circuit H is supplied from a horizontal oscillator circuit (not shown) through a terminal T1. The horizontal drive and horizontal oscillator may comprise any standard circuitry as well known in the television art.

An inductor L1 is connected between the collector of the transistor Q1 and a terminal T2 to which is applied direct operating voltage V+ from a source (not shown). A direct current connection is thus made between the terminal T2 at the V+ potential through the inductor L1 to the collector of the transistor Q1. The inductance value for the inductor L1 is selected to be high compared to that of the inductance of the yoke $Ly$ so as not to affect the scanning operation of the circuit. A capacitor C3 is connected between the deflection yoke L*y* and the inductor L1. The capacitor C3 is commonly called the "S" capacitor and is utilized to modify the waveform of the scanning current developed in the yoke L*y* as will be explained below.

A high voltage transformer TR1 is provided and includes a primary winding W1, a high voltage winding W2 on the secondary of the transformer and a heater winding W3 also on the secondary of the transformer. A capacitor C2 is connected between the collector electrode of the transistor Q1 and one end of the primary winding W1, the other end of the primary winding being at ground potential. The high voltage winding W2 is connected to the anode of a high voltage rectifier tube R at one end thereof, with the other end being grounded. The cathode of the rectifier tube R is connected across the heater winding W3 so that heater current is supplied thereto. A filtering capacitor C4 is connected between the cathode of the rectifier tube R at a junction point J1 and ground. An output terminal T3 is connected to the junction point J1 at the cathode electrode of rectifier R. The high voltage output which is a unidirectional voltage is developed at the terminal T3 and is supplied to the anode of the cathode ray tube (not shown) of a television receiver.

Assume initially for the purposes of explanation that the capacitors C2 and C3 are shorted to provide direct connections thereacross and that the inductor L1 is removed from the circuit. Now also referring to the curves of FIG. 2, at the time *t*0, a positive polarity voltage from the horizontal drive circuit H is applied to the base of the transistor Q1 as shown in curve A of FIG. 2. The transistor Q1 therefore is biased to a conductive state. The collector current I*c* in the collector-emitter circuit of the transistor Q1 at this time is increasing in a substantially linear fashion in the direction as indicated in FIG. 1 and curve V of FIG. 2. Collector current I*c* will rise in a substantially linear fashion to a peak value approximately equal to $$\frac{V+}{L}\times\tau 1$$

where $\tau 1$ is the time cycle over which the collector current flows, V+ is the operating voltage, and L is the effective inductance of the circuit. This linear increase in circuit results because the effective inductance of the high voltage transformer TR1 and its loading is very large compared to the impedance of the yoke L*y*.

At the time *t*1 the collector current I*c* reaches its maximum amplitude. At this time the polarity of the voltage output of the horizontal drive circuit H is negative thereby rendering the transistor Q1 nonconductive. The time *t*1 marks the end of the trace portion of the scanning cycle and the beginning of the retrace portion. The base drive of transistor Q1 causes the collector current I*c* to go to zero substantially instantaneously. The deflection or yoke current I*d*, as shown in curve D of FIG. 2, begins to decrease from a positive value toward zero at this time. The resonating capacitor C1 connected across the yoke L*y* is selected to have a capacitance which determines the retrace resonant frequency of the scanning current I*d*. With the deflection current I*d* decreasing the capacitor C1 will charge to substantially the direct source potential V+. When the capacitor C1 has reached its peak voltage value, the deflection current I*d* will be at the zero deflection current value, and the deflection current I*d* will start negative with the capacitor C1 discharging therethrough. The deflection current I*d* will reach its maximum negative value at a time *t*2 when the capacitor C1 is discharged to a substantially zero voltage. As the resonance between the capacitor C1 and the inductance of the circuit tries to continue, the capacitor C1 will charge to a voltage just sufficient to forward bias the damper diode D1. The capacitor voltage will now be clamped to this value with the negative yoke current beginning its substantially linear discharge through the damper diode D1 to a zero value at a time *t*4. The damper diode current I1 is shown in curve C beginning at the time *t*2 and ending at the time *t*4.

When the yoke current I*d* and the damper diode current I1 reach zero value at the time *t*4, the transistor Q1 will be biased to be in a conductive state at this time. A positive polarity voltage from the horizontal drive circuit H is applied to the base of the transistor Q1 at a time *t*3 somewhat before the time *t*4 to insure the turning on of the transistor Q1 at that time and also to account for any energy losses occurring in the circuitry. With the transistor Q1 being rendered conductive, its collector current will increase substantially linearly from the time *t*4 to the time *t*5 when the transistor will again be rendered nonconductive by the application of a negative voltage to the base electrode thereof from the horizontal drive source H. During the time period *t*4 to *t*5 the deflection current I*d* through the deflection yoke L*y* will also increase linearly as is shown in curve D of FIG. 2. The trace portion of the scanning cycle is thus defined between the times *t*2 and *t*5. The horizontal scanning trace frequency is approximately 15,750 cycles per second, with the retrace period being about 10 microseconds.

Figure 2:
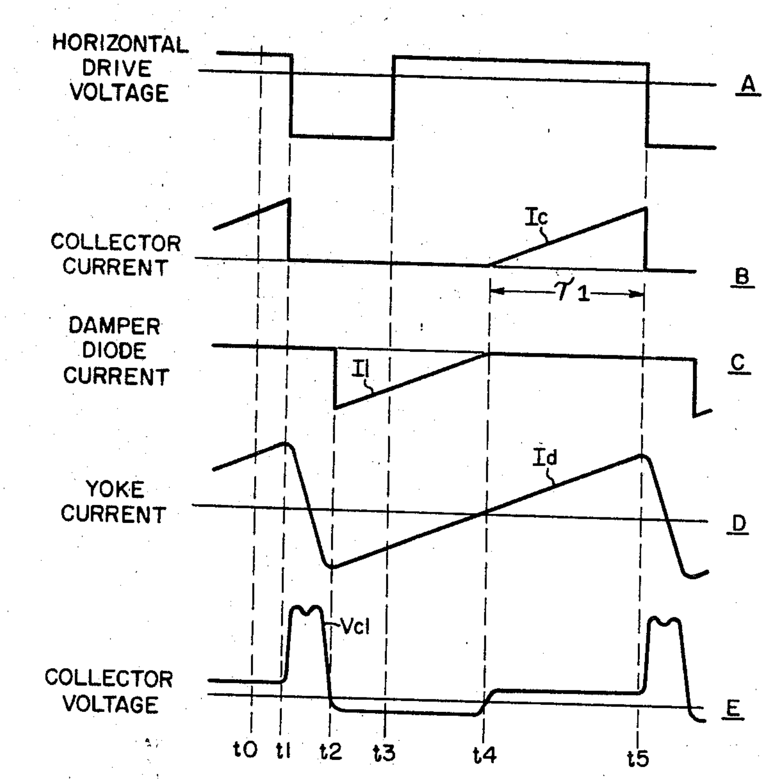

The collector voltage of the transistor Q1 is shown in curve E of FIG. 2. During the time period *t*1 to *t*2, when the transistor Q1 is nonconductive, the collector voltage is the maximum as shown by the pulse V*c*1. During the time interval *t*2 to *t*4, when the damper diode D1 is conductive, the collector voltage is slightly negative due to the forward drop of the diode D1. However, when the transistor Q1 is again rendered conductive at the time *t*4, the collector voltage goes slightly positive until the time *t*5 when again the transistor is rendered nonconductive.

The high voltage transformer TR1 is constructed so that the secondary winding W2 is loosely coupled to the primary winding W1 and is also designed so that its leakage inductance resonates with the effective distributed capacitance of the high voltage secondary winding W2 at approximately the third harmonic frequency of the retrace frequency. These design criteria provide a high voltage output from the winding W2 which is approximately 1.7 times the peak output from the secondary winding W2 compared to that which otherwise would be expected with a perfect transformer. The "third harmonic tuning" of the transformer TR1 is illustrated by the ripple on the top of the pulse V*c*1 of curve E of FIG. 2. The high voltage output from the winding W2 is developed during the retrace portion of the scanning cycle and may be of the order of 20,000 volts. This voltage is rectified in the high voltage rectifier tube R and supplied to the terminal T3 for application to the anode of a cathode ray tube.

So far the normal operating conditions of the circuit under the assumed circuit conditions have been described. Assume now, however, that arcing occurs across the high voltage rectifier tube R. High voltage arcing will occur, if at all, during the trace portion of the scanning cycle when maximum reverse voltage appears across the rectifier R. When high voltage arcing occurs, the leakage inductance of the high voltage transformer TR1 is placed essentially in parallel with the yoke L*y*. In normal circuit design, the leakage inductance of the high voltage transformer TR1 may be as little as one-half that of the inductance of the yoke L*y*. Thus the total effective inductance of the leakage inductance and the yoke inductance will be one-third of the normal yoke inductance. The collector current I*c* of the transistor may thus rise to three times its normal value under arcing conditions in that the total inductance is only one-third its normal value. The transistor Q1 will, of course, come out of saturation under such high current, since there will be insufficient base current supplied to the base of the transistor to maintain it in saturation. The transistor Q1 being unable to remain in saturation will operate in its peak power dissipation state, that is, at high collector-to-emitter voltage and current. Under these conditions, the power handling capability probably will be exceeded and failure of the transistor will result. It should also be noted that the arcing condition may exist for a number of scanning cycles. Thus, operation of the transistor under peak power dissipation conditions over a number of cycles enhances the probability of device failure.

High voltage arcing may also occur between the terminal T3 of the anode of the cathode ray tube of the television receiver and ground. If such high voltage arcing were to occur, it would be necessary that the transistor Q1 supply additional power to the high voltage transformer TR1. This would necessitate that the transistor Q1 be conductive for a longer time period than otherwise would be the case. Due to the increased conduction and magnitude of the current flow, it is probable that the core material of the high voltage transformer TR1 would saturate. Saturation of the high voltage transformer TR1 causes the self inductance of the transformer effectively to shunt the deflection yoke Ly thereby causing excessively high collector current to flow in the transistor Q1. The transistor Q1 being unable to remain in saturation under such high current conditions will operate in a high peak power dissipation condition which will result in the probable destruction of the transistor. It can thus be seen that it becomes imperative that some means be provided to protect the transistor Q1 from such high voltage arcing conditions as have just been described.

The protective features of the circuit of FIG. 1 will now be described. Consider that the circuit is connected as shown in FIG. 1 with the capacitor C2 connected between the collector electrode of the transistor Q1 and the primary winding W1 of the high voltage transformer TR1; the inductor L1 connected between the terminal T2 and the collector electrode; and the capacitor C3 connected between the terminal T2 and the deflection yoke Ly. The capacitor C3 is normally utilized in horizontal scanning circuits as a so-called "S" capacitor to provide flat-face correction of the cathode ray tube. Due to the curvature of the screen of a cathode ray tube, it is necessary to retard the trace current at the beginning and end of the trace portion of the scanning cycle. This retardation is necessary since the electron beam would otherwise scan a greater distance at the extremities of the screen than the picture tube as compared to the middle of the screen in a given period of time due to the curvature of the screen. By the connection of the capacitor C3 between the operating voltage at terminal T2 and the yoke Ly, direct current is blocked from the yoke Ly and a substantially parabolic voltage waveform appears across the capacitor C3. This then results in the yoke voltage being lower at the ends at the trace cycle as compared to the middle of the cycle, and thereby provides the desired flat-face correction.

The inductor L1 connected between the operating potential V+ and the collector of the transistor Q1 is selected to have a relatively high inductance as compared to the inductance of the deflection yoke Ly. The inductor L1 thus provides a direct current connection from the direct current source supplying the voltage V+ to the collector of the transistor Q1 so that adequate operating potential is applied to the transistor Q1. Also, the selection of the inductance of the inductor L1 as being substantially higher than that of the yoke inductance causes the inductor L1 to have a relatively high impedance at the scanning rate of the scanning circuit and therefore appears at a relatively high impedance in the circuit and thus does not affect the operation of the circuitry.

The capacitor C2 couples the collector of the transistor Q1 to the primary winding W1 of the high voltage transformer TR1. The capacitor C2 is selected to have a relatively low impedance at the third harmonic of the retrace frequency of the horizontal scanning cycle. This "third harmonic" frequency is approximately 150 kilocycles per second. The capacitor C2 having a low impedance at the third harmonic frequency as described permits the development of the full value of the high voltage required in the secondary winding W2 of the high voltage transformer. However, the capacitance of the capacitor C2 is selected to provide a relatively high impedance at the trace frequency rate of approximately 15,750 cycles per second. A typical value of capacitance that provides a relatively low impedance at the third harmonic of the retrace frequency and a relatively high impedance at the trace frequency is 0.047 millifarad.

The selection of the capacitor C2 to have a relatively high impedance during the trace portion of the scanning cycle, when high voltage arcing is most likely to take place, effectively isolates the transistor Q1 from the primary winding W1 of the high voltage transformer TR1. Thus, if high voltage arcing should occur in the high voltage portion of the circuitry, the high impedance of the capacitor C2 at the trace scanning frequency would appear between the collector of the transistor Q1 and the primary winding W1. This will prevent the collector current Ic of the transistor Q1 from rising appreciably beyond safe limits. Therefore, this high impedance will prohibit the transistor from being placed in a peak power dissipation condition. With only a relatively small increases in the collector current resulting, sufficient base current can be supplied to the transistor Q1 so that it will not be taken out of saturation during the trace portion of the scanning cycle even if arcing should occur. Moreover, due to the high impedance of the capacitor C2 during the trace portion of the cycle, insufficient current will be supplied to primary winding W1 of the high voltage transformer TR1 to cause it to saturate. Therefore, this will also prevent the collector current Ic from increasing beyond a safe value.

A list of components which provide satisfactory operation of the circuit shown in FIG. 1 follows:

Transistor D1, Westinghouse Part 297V069C01
Capacitor C1, 7500 picofarads
Capacitor C2, 0.047 millifarad
Capacitor C3, 0.75 millifarad
Capacitor C4, approx. 2000 picofarads
Deflection yoke Ly, 640 micro-henries
Inductor L1, approx. 24 milli-henries
Diode D1, Westinghouse Part 295V029C01
High voltage rectifier tube, 1K3
High voltage transformer, Westinghouse Part 493V022C01
V+ voltage at terminal T2, 60 volts DC
High voltage at terminal T3, 19.5 kilovolts DC Using the above circuit components, it was found that for high voltage arcing conditions the collector current of the transistor increased only by 30% as compared to 300% without the use of the protective circuitry of FIG. 1. It thus can be seen that the circuit shown in FIG. 1 provides a horizontal scanning circuit which is protected against destruction of the semiconductor switching device thereof due to high voltage arcing which is common in the high voltage circuitry of a television receiver.

Although the present invention has been described with a certain degree of particularity, it should be understood that the present disclosure has been made only by way of example and that numerous changes in the details of construction and the combination and arrangement of parts, elements and components may be resorted to without departing from the scope and the spirit of the present invention.

What is claimed is:

1. In a scanning circuit operative with a source of direct operating potential and a high voltage transformer, the combination of:

a semiconductor switching device operative in a switching mode;

means for applying said direct operating potential to said semiconductor switching device;

means for controlling the switched state of said semiconductor switching device to define the trace and retrace portions of the scanning cycle of said scanning circuit;

a deflection coil operatively connected to said semiconductor switching device;

resonating capacitance means operatively connected to said deflection coil;

a unidirectional device operatively connected to said semiconductor switching device being poled to conduct current in a reverse direction to said semiconductor switching device; and coupling capacitive means operatively connected between said semiconductor switching device and said transformer, said coupling capacitance means presenting a relatively low impedance at approximately the third harmonic of the retrace scanning frequency and a relatively high impedance at the trace scanning frequency to prevent damage to said semiconductor switching device should high voltage arcing occur at the output of said high voltage transformer.

2. In the combination of claim 1 wherein:

said semiconductor device comprises a transistor operative in a switching mode.

3. In the combination of claim 2 wherein:

said means for applying said direct operating potential from said source comprises an inductor operatively connected between said source and said transistor, said inductor providing a direct current path to said transistor but having a relatively high impedance at the trace scanning frequency so as to not affect the scanning operation of said scanning circuit.

4. In the combination of claim 3 further including:

a capacitor connected in series with said deflection coil for retarding the current flow therethrough at the beginning and end of the trace portion of the scanning cycle.

5. In the combination of claim 3 wherein:

said transistor includes a base, collector and emitter electrodes, said unidirectional device comprising a damper diode operatively connected between said collector and emitter electrodes, said coupling capacitive means including a coupling capacitor connected between said collector electrode and said transformer.

6. In the combination of claim 5 wherein said high voltage transformer includes a primary winding and a secondary winding, a high voltage rectifier being connected to said secondary winding to provide a unidirectional output therefrom and wherein:

said coupling capacitor is connected between said collector electrode and said primary winding, said coupling capacitor having such a capacitance to present a relatively low impedance at approximately the third harmonic of the retrace scanning frequency and a relatively high impedance at the trace scanning frequency to prevent excessive collector current to flow in said transistor should high voltage arcing occur at or about said high voltage rectifier.

References Cited

UNITED STATES PATENTS

| | | |
|---|---|---|
| 3,189,782 | 6/1965 | Heffron. |
| 3,323,001 | 5/1967 | Mackellar. |

OTHER REFERENCES

Buchsbaum; "Line-Operated Transistor TV Sets: Emerson," Electronics World, February 1966, pp. 40 and 74.

RODNEY D. BENNETT, Jr., *Primary Examiner.*

M. F. HUBLER, *Assistant Examiner.*

Dedication 3,437,877.—*Charles B. Heffron*, Metuchen, N.J. SCANNING CIRCUIT. Patent dated April 8, 1969. Dedication filed Mar. 16, 1972, by the assignee, *Westinghouse Electric Corporation.*

Hereby dedicates to the People of the United States the entire term of said patent.

[*Official Gazette December 5, 1972.*]